(12) United States Patent
Lee et al.

(10) Patent No.: US 10,266,009 B2
(45) Date of Patent: Apr. 23, 2019

(54) HYBRID CORD AND TIRE USING THE SAME

(71) Applicant: HANKOOK TIRE CO., LTD., Seoul (KR)

(72) Inventors: Ji Wan Lee, Daejeon (KR); Kil Ju Ko, Daejeon (KR); Sung Tae Kim, Daejeon (KR); Hyun Ran Cho, Daejeon (KR); Il Yong Park, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 226 days.

(21) Appl. No.: 15/409,129

(22) Filed: Jan. 18, 2017

(65) Prior Publication Data

US 2017/0210168 A1     Jul. 27, 2017

(30) Foreign Application Priority Data

Jan. 25, 2016     (KR) .......................... 10-2016-0008739

(51) Int. Cl.
*B60C 9/00* (2006.01)
*D02G 3/48* (2006.01)
(Continued)

(52) U.S. Cl.
CPC ............ *B60C 9/005* (2013.01); *B60C 9/0042* (2013.01); *B60C 9/0064* (2013.01); *D01F 6/60* (2013.01);
(Continued)

(58) Field of Classification Search
CPC ..... B60C 9/005; B60C 9/0064; B60C 9/0042; B60C 2009/2096; B60C 2009/2077; D01F 6/605; D01F 6/60; D02G 3/48
See application file for complete search history.

(56) References Cited

U.S. PATENT DOCUMENTS 3,692,080 A * 9/1972 Boileau ................. B60C 9/0028
152/527
4,159,618 A * 7/1979 Sokaris .................. D02G 3/404
428/364
(Continued)

FOREIGN PATENT DOCUMENTS

CN     1620532 A     5/2005
JP     S57-143535 A     9/1982
(Continued)

OTHER PUBLICATIONS

Kevlar@ Aramid fiber teachnical guide,Mar. 15, 2015, http://www.dupont.com/content/dam/dupont/products-and-services/fabrics-fibers-and-nonwovens/fibers/documents/Kevlar_Technical_Guide.pdf.*
(Continued)

*Primary Examiner* — Shaun R Hurley
*Assistant Examiner* — Bao-Thieu L Nguyen
(74) *Attorney, Agent, or Firm* — Marshall, Gerstein & Borun LLP

(57) ABSTRACT

Disclosed are a hybrid cord produced by plying and twisting high modulus yarns and polyamide monofilaments, and a tire including the same. More specifically, disclosed is a method of producing a hybrid cord having a clear core-covering structure including a core comprising a polyamide monofilament and a covering spirally twisted around the core and comprising a high modulus yarn. The hybrid cord can clearly control the modulus ratio in each area, improving production efficiency of the cord and processability of the tire and reducing deviations of uniformity and driving performance. In addition, the tire using the hybrid cord reduces tire deformation during driving, thus satisfying both driving performance and comfort.

8 Claims, 2 Drawing Sheets

(51) Int. Cl.
*D01F 6/60* (2006.01)
*B60C 9/20* (2006.01)

(52) U.S. Cl.
CPC ............ *D01F 6/605* (2013.01); *D02G 3/48* (2013.01); *B60C 2009/2077* (2013.01); *B60C 2009/2096* (2013.01); *D10B 2331/02* (2013.01)

(56) References Cited

U.S. PATENT DOCUMENTS

| | | | | | |
|---|---|---|---|---|---|
| 4,343,343 | A | * | 8/1982 | Reuter | B29D 30/22 152/556 |
| 4,893,665 | A | * | 1/1990 | Reuter | B60C 9/0042 152/451 |
| 5,145,172 | A | * | 9/1992 | Takashima | A63B 51/02 428/377 |
| 5,298,322 | A | * | 3/1994 | Hennecken | B30B 15/061 100/295 |
| 5,427,165 | A | * | 6/1995 | Balestra | B60C 9/0042 152/450 |
| 5,555,716 | A | * | 9/1996 | Dugan | D02G 3/36 57/210 |
| 6,460,321 | B1 | * | 10/2002 | Koshimae | A63B 51/02 57/210 |
| 7,222,481 | B2 | * | 5/2007 | Esnault | D02G 3/48 57/210 |
| 2005/0055997 | A1 | * | 3/2005 | Bader | D02G 3/367 57/224 |
| 2005/0155336 | A1 | * | 7/2005 | Robins | D02G 3/38 57/210 |
| 2006/0048497 | A1 | * | 3/2006 | Bloch | D02G 3/06 57/230 |
| 2014/0000750 | A1 | * | 1/2014 | Carrara | D02G 3/365 139/420 R |
| 2014/0090349 | A1 | * | 4/2014 | Fisher | D02G 3/367 57/222 |
| 2017/0204540 | A1 | * | 7/2017 | Duan | D02G 3/449 |
| 2017/0327977 | A1 | * | 11/2017 | Cornille | D02G 3/48 |

FOREIGN PATENT DOCUMENTS

| | | |
|---|---|---|
| JP | H01-247204 A | 10/1989 |
| KR | 2003-13904 Y1 | 2/2003 |
| KR | 20040077875 A | 9/2004 |

OTHER PUBLICATIONS

Extended European Search Report issued in European Application No. 17152997.7, dated May 29, 2017.
Japanese Office Action issued in Patent Application No. 2017-000579 dated Nov. 17, 2017.
Korean Office Action issued in Korean Application No. 20160008739, dated Jun. 19, 2017.
Office Action issued in Chinese Patent Application No. 201710025833.7 dated Aug. 24, 2018.

* cited by examiner

HYBRID CORD AND TIRE USING THE SAME

TECHNOLOGICAL FIELD

The present disclosure relates to a hybrid cord and a tire including the same and more particularly, to a hybrid cord having a core-covering structure and a tire including the same.

BACKGROUND OF THE DISCLOSURE

Tire belts for general passenger cars and lightweight trucks may receive high centrifugal force during driving and thus be detached because they are composed of a steel cord and thus have a high specific gravity. Accordingly, to prevent such an accident, the steel cord may be replaced by a lightweight fiber cord or a tire structure, so-called, "capply" which can fix the belt to improve durability.

As driving speed increases, an increased strength is required for the fiber cord or capply. In an attempt to increase the strength of the fiber cord or capply, in general, a plurality of fiber cords or capplies are used or the arrangement density thereof is increased.

The nylon-66 cord conventionally used as the fiber cord or capply cord is generally used in the form of a thick cord or a laminate of two or more cords due to insufficient strength. This form increases weight and volume, and is thus disadvantageous in terms of heat dissipation, thus causing deterioration in tire durability.

Korean Patent No. 2003-13904 designed in order to solve this problem discloses a hybrid cord (complex fiber cord) with excellent strength and adhesive strength which includes a cord with high strength composed of a mono-filament and nylon-66 with excellent adhesive strength disposed around the cord to reduce the amount of used cord and thereby a tire weight. However, such a structure in which the center of the hybrid cord is composed of only one aramid mono-filament is inapplicable to tire capply cords that frequently bend and stretch due to drawback of poor fatigue resistance.

In addition, inventions associated with aramid hybrid cords used as reinforcement belts for conventional highly functional tires have focused on the ratio between initial modulus and breaking modulus. Representative aramid hybrid-related prior patents include Japanese Patent Publication No. 01-247204 by Sumitomo Rubber Industries Ltd. and U.S. Pat. No. 7,222,481 by Michelin. The Sumitomo Rubber Industries Ltd. patent defines the ratio between initial modulus and final modulus to 2 to 9 and the Michelin patent defines the ratio between initial modulus and final modulus to 10 or more.

The patents associated with the modulus ratio have an ambiguous range because they do unclearly define the initial modulus. Theoretically, initial modulus is defined as a slope of tangent at a strain of zero on a stress-strain curve. However, when tangent is drawn at zero on a real tire cord measurement graph, a very small slope is obtained. To prevent this phenomenon, a certain area should be set and a tangent (tan α) slope value should be obtained. However, the patents do not disclose such an area. In addition, actually, it is unclear whether or not the slope of the tangent at a strain of zero accurately represents an initial modulus under an initial load condition of 0.5 cN/tex or 0.05 g/d in a general tensile test.

Due to the structural characteristics in which the collection force of fiber bundles constituting the cord is insufficient at a load less than a predetermined level under conventional initial load conditions or at infinitesimal intervals, stress is not evenly distributed and the cord is structurally deformed. For this reason, it is not sufficient to define an initial modulus of a material under the initial load condition during a tensile test.

This phenomenon makes the modulus at an initial infinitesimal interval lower than the desired value. In reality, when a tensile test is conducted at an initial load of 0.05 g/d applied only with an aramid cord and the slope of the tangent at the origin, that is, modulus at an infinitesimal interval at the origin is obtained, the ratio of initial modulus to final modulus may be obtained as the undesired value, e.g., 1:10.

In addition, Japanese Patent Publication No. 01-247204 and U.S. Pat. No. 7,222,481 associated with the aramid hybrid cord disclose that nylon is disposed in the core whereas aramid is disposed in the covering when the twist number of aramid plies is different from that of polyamide 66 plies. However, In reality, although very flexible fibers are cabled at different twist numbers, the core is unclearly distinguished from the covering.

SUMMARY OF THE DISCLOSURE

In order to solve this problem, the present disclosure suggests a hybrid cord structure different from conventional structures. The most distinct feature of the structure is to actually realize a core-covering structure based on high stiffness caused by the shape of monofilaments used instead of polyamide plies, provide desired physical properties using this structure and obtain an ideal aramid hybrid cord or capply on the tire. Therefore, the present disclosure has been made in view of the above problems, and it is an object of the presently described embodiments to provide a hybrid cord that reduces deformation of a tire during driving and thereby satisfy driving performance as well as comfort.

In addition, it is another object of the presently described embodiments to provide a tire produced from the hybrid cord.

In accordance with the presently described embodiments, the above and other objects can be accomplished by the provision of a hybrid cord having a core-covering structure including a core including a polyamide monofilament and a covering spirally twisted around the core and including a high modulus yarn.

The high modulus yarn may include any one selected from the group consisting of aramid, aromatic polyamide, totally aromatic polyester and a mixture thereof.

The high modulus yarn may have a conditioned size of 500 to 2,250 denier and the high modulus yarn may have a tensile strength of 16 g/d or more and a Young's modulus of 200 g/d or more.

The polyamide monofilament may have a diameter of 0.2 to 0.8 mm and may have a stiffness of 0.5 to 4 g•cm.

The hybrid cord may have a twist number obtained by the following Equation 1 of 100 to 250.

$$\alpha_d = \frac{T}{100}\sqrt{\rho_d} \qquad \text{Equation 1}$$

wherein $\alpha_d$ is a twist number based on denier,

T is twist per meter (TPM), and $\rho_d$ is a conditioned size based on denier, of the hybrid cord.

The hybrid cord may have a cable twist number of 200 to 500 TPM.

In another aspect of the present disclosure, provided is a tire including the hybrid cord.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, embodiments will be described in more detail such that a person having ordinary knowledge in the field to which the present disclosure pertains can easily implement the embodiments. However, the embodiments can be implemented in various forms and should not be interpreted as being limited to the embodiments described in the specification.

The terms used in the present specification are used only to describe specific embodiments and are not intended to be limiting. Singular expressions may include the meaning of plural expressions unless clearly specified otherwise. In the present application, it should be understood that terms such as "comprises" or "has", are intended to indicate that disclosed features, numbers, steps, operations, components, parts or combinations thereof exist, and the probability of existence or addition of one or more other features, steps, operations, components, parts or combinations thereof is not excluded thereby.

Figure 1:
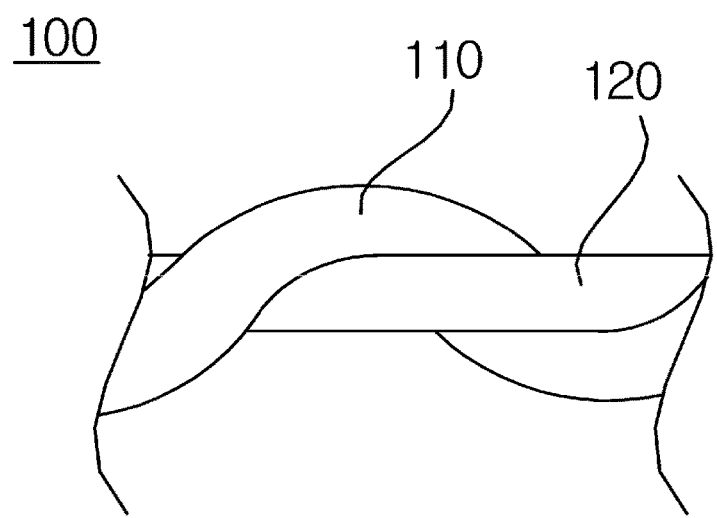
FIG. 1 is a schematic view illustrating a hybrid cord according to an embodiment.

FIG. 1 is a schematic view illustrating a hybrid cord according to an embodiment.

The hybrid cord (100) according to an embodiment core includes a hybrid cord having a core-covering structure in which a core includes a polyamide monofilament (120) and a covering spirally twisted around the core includes a high modulus yarn (110).

More specifically, provided is a method of manufacturing a hybrid cord (100) including a high modulus yarn (110) such as aramid, aromatic polyamide or totally aromatic polyester and a low modulus monofilament (120) such as polyamide 66. According to the presently described embodiments, it is possible to accurately control the modulus ratio in each region, improve production efficiency of cords for reinforcement belts of high-performance radial tires and processability of tires and thereby reduce deviations in uniformity and driving performance as compared to conventional aramid-polyamide hybrid cords.

Conventional aramid-polyamide hybrid cords use the difference in twist number between aramid plies and polyamide plies such that the polyamide plies are disposed in the core and the aramid plies are disposed in the covering and is based on the principle that a certain modulus is formed to realize physical properties of tires upon application of a load to aramid plies of the covering, while polyamide plies of the core are readily deformed upon initial strain of the cord to secure processability.

However, conventional aramid-polyamide hybrid cords use multifilament-type polyamide yarns. In reality, both an aramid ply and a polyamide ply have a multifilament structure including very thin filaments, which may lead to a problem in which a polyamide segment cannot be sufficiently incorporated into the core due to low bending resistance and the core-covering structure may be unclear and non-uniformly produced. For this reason, the difference in physical properties in the aramid-polyamide hybrid cord is increased, it is difficult to secure production uniformity of the cord, and the difference in the tire may occur.

To solve this problem, the presently described embodiments utilize a monofilament as a polyamide ply instead of a conventional multifilament. In this case, due to high bending resistance of the polyamide monofilament, the core is clearly distinguished from the covering and thus desired properties of the hybrid cord can be obtained.

The high modulus yarn (110) may include any one selected from the group consisting of aramid yarn, aromatic polyamide, totally aromatic polyester (polyarylate) and a mixture thereof.

The aramid yarn may be para-aramid, more specifically, poly(p-phenylene terephthalamide) (PPTA). PPTA exhibits a liquid crystal in a certain concentration of a concentrated sulfuric acid solution and is obtained by air-gap wet spinning.

More specifically, the aromatic polyamide may be co-poly 3,4'-diphenylether/para-phenylene terephthalate (DPE/PPTA) which has isotropy, but not liquid crystallinity, when dissolved in a solvent and thus stretches 10 times or more during thermal treatment after air-gap wet spinning and thus develops a microstructure.

The totally aromatic polyester (polyarylate) is a high-strength fiber which has thermotropic liquid crystallinity and is obtained by melt spinning.

The polyamide monofilament (120) has much higher flexural stiffness than conventional polyamide multifilament yarns and thus can form a core-covering structure. In a case in which flexural stiffness of conventional polyamide yarns is measured without twisting or thermal treatment, low stiffness which is impossible to measure is obtained. On the other hand, the polyamide monofilament has a stiffness prior to twisting, measured in accordance with a test method of ASTM-D885, of 0.5 to 4 g•cm.

The polyamide monofilament (120) may be a monofilament selected from polyamide 6, polyamide 66, polyamide 610, polyamide 11, polyamide 12 and a copolymer or a mixture thereof, and more specifically polyamide 66.

More specifically, the hybrid cord (100) has a tensile strength of 16 g/d or more and a Young's modulus of 200 g/d or more, and is produced by using 20 to 80% by weight of a high modulus yarn (110) having a unit ply of 500 to 2,250 denier and 80 to 20% by weight of a polyamide monofilament (120) with a diameter of 0.2 to 0.8 mm, and is produced using the twist number of cable twist plies for plying of the hybrid cord, that is, the twist number of the cables, of about 200 to 500 TPM (twist per meter). In addition, this can be changed according to the twist number depending on conditioned size of the hybrid cord. When the twist number is less than 200 TPM, collection force may be insufficient, and when the twist number exceeds 500 TPM, modulus may be deteriorated.

When a proportion of the high modulus yarn (110) in the hybrid cord (100) is less than 20% by weight, an effect of modulus increase at a high load is slight and the desired improvement in driving performance cannot be thus obtained, and when the proportion of the high modulus yarn (110) exceeds 80% by weight, noise and ride comfort are deteriorated due to very high initial modulus and the hybrid cord (100) is inapplicable to high-quality tires.

To obtain a change of initial-middle modulus of the stress-strain curve, the hybrid cord 100 can be produced using the following method.

First, in order to form a structure in which the polyamide monofilament (120) is used as the core and the high modulus yarn (110) is used as the covering, during plying and twisting, the presently described embodiments suggest formation of a core-covering structure in a plying process using a direct cabler, instead of a conventional method conducted under different twist number conditions of first twist (ply twist) of the polyamide yarn and the high modulus yarn through a ring twister, a plying machine (2 for 1) or the like.

A feeding (unwinding) ratio of high modulus yarn, in particular, aramid yarn, to polyamide monofilament during plying and twisting is adjusted to 1:1.05 to 1:1.2. When the ratio of high modulus yarn to the polyamide monofilament is less than 1.05, the core-covering structure cannot be obtained and when the ratio exceeds 1.2, the modulus transfer point of the hybrid cord may occur after an elongation of 4 to 5%.

The polyamide-aramid ply yarn cable thus obtained is woven and thermal treatment is then conducted. At this time, in order to form the core-covering structure, thermal treatment is conducted at a suitable low tension or low stretch (elongation). The thermal treatment may be carried out at 220 to 248° C. after drying at 140 to 150° C. and the elongation may range from 0.98 to 1.02. When the thermal treatment is conducted at a temperature less than 220° C., the reaction of an adhesive liquid cannot be sufficiently obtained and problems of insufficient adhesive strength and insufficient thermal fixing of the cord may occur, and when the thermal treatment temperature exceeds 248° C., a problem of nylon monofilament damage during processing may occur.

More specifically, an aramid fiber bundle which has a linear tensile curve and has very high initial modulus and polyamide monofilament which has low initial modulus are plied and, at the same time, are twisted in a direct cabler.

At first, the polyamide monofilament extends well to improve processability and an extending aramid yarn, in addition to the extended polyamide monofilament, enhances stiffness of the produced tire.

In addition, conventional polyamide-aramid ply yarns have an unclearly defined core-covering boundary due to combination of cable twist yarn (secondary twist yarn) and ply twist yarn (primary twist yarn) resulting from low stiffness and the hybrid cord including a monofilament can maintain a linear shape due to greater stiffness of the polyamide monofilament.

When the amount of fed aramid with respect to the polyamide monofilament is increased and twisting is further added, a core-covering structure is basically completed. When weaving and thermal treatment are conducted based on this, a hybrid cord having a core-covering structure and including a monofilament can be produced from a high modulus yarn including aramid and the polyamide monofilament.

The twist number of the hybrid cords may be 100 to 250 when the following equation 1 is applied. When the twist number obtained according to the following equation 1 is less than 100, insufficient collection force of the cord may cause deterioration in strength and processability, and when excessive twisting is conducted at a twist number exceeding 250, the strength and modulus of the cord are deteriorated and the cord is thus inapplicable to tires with desired performance.

$$\alpha_d = \frac{T}{100}\sqrt{\rho_d} \qquad \text{Equation 1}$$

In Equation 1 generally showing a twist number, $\alpha_d$ is a twist number based on denier, T is twist per meter (TPM), and $\rho_d$ is a conditioned size (unit: denier) of the hybrid cord.

In addition, a hybrid cord (100) which has strength to conditioned size of 11 g/d or more, an initial modulus of 20 to 50 g/d and a high load modulus of 30 to 300 g/D can be produced.

The hybrid cord can solve difficulties of conventional cord production processes and process problems when applied to tires, thus offering easy prediction of tire performances based on improvement in uniformity of tire performances and reduction of production deviation and reducing difficulties in setting tension process conditions during tire production.

Figure 2:
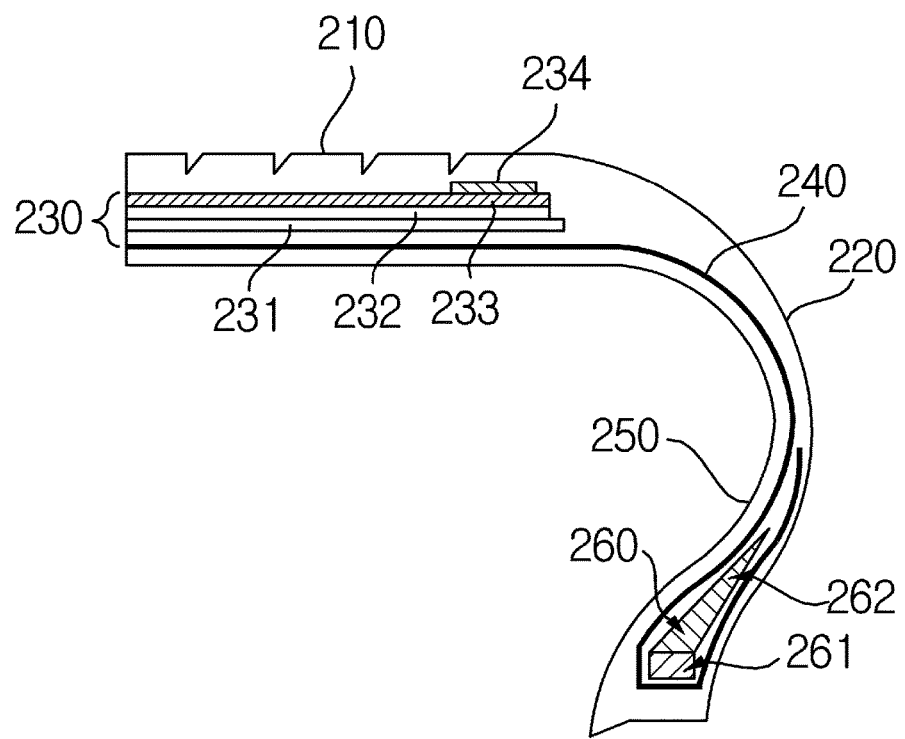
FIG. 2 is a schematic view illustrating a cross-section of a tire according to another embodiment.

According to another embodiment, a tire including the hybrid cord is provided. FIG. 2 is a sectional view schematically illustrating a cross-section of the tire.

Referring to FIG. 2, the tire (200) includes a tread (210), a side wall (220), a belt (230), a carcass (240), an inner liner (250) and a bead (260).

The tread (210) transfers driving force and break force of a vehicle using a part directly contacting the road and includes a cap tread and an under tread.

The tread (210) protects the carcass (240) from exterior impact and functions as a messenger transferring movement of a steering wheel to the tread (210) via the bead (260).

The belt (230) may include a belt for controlling performances such as road contact force and handling, a reinforcement capply for preventing separation between the belt layers, a belt cushion and the like. That is, the belt (230) may utilize the tire cord including a hybrid cord including a monofilament according to one embodiment, instead of the steel cord as the belt.

The carcass (240) functions as a skeleton constituting the tire and maintains an air pressure with the inner liner (250) to support a load applied from the outside. The inner liner (250) functions to maintain the air pressure in the tire.

The hybrid cord, which is a reinforcement material using the monofilament, is applicable to any one of the tread (210), the side wall (220), the belt (230), the carcass (240) and the inner liner (250), in particular, is suitably applicable to the belt cord (231 or 232), or the capply (233) of the belt (230). The tire (200) is not limited to the structure and can be applied to all conventionally known tire structures.

The tire (200) may be a passenger tire, an airplane tire, a racing tire, an agricultural machine tire, an off-road tire, a truck tire, a bus tire or the like, but the presently described embodiments are not limited thereto. In addition, the tire (200) may be a radial tire or a bias tire.

Hereinafter, embodiments will be described in more detail such that a person having ordinary knowledge in the technological field can easily implement the embodiments. However, the embodiments can be implemented in various forms and should not be construed as being limited to the embodiments described herein.

Production Example: Production of Hybrid Cord Including Monofilament

The cords of Comparative Examples 1 to 3 and Examples 1 and 2 were produced using the composition shown in the following Table 1.

Comparative Example 1 uses only polyamide 66 to produce a cord, Comparative Example 2 uses only aramid to produce a cord, and Comparative Example 3 uses a polyamide 66 ply and an aramid ply to produce a hybrid cord by a conventional method.

In Examples 1 and 2, a polyamide 66 monofilament with a thickness of 0.5 mm is used for a core, an aramid ply is used for a covering, plying and/or twisting under the condition of 1.2 fold increased aramid unwinding in an direct cabler and thermal treatment at 245° C. and an elongation of 1.00 were conducted to produce a hybrid cord having a core-covering structure. In Example 1, the conditioned size of the aramid yarn was cut in half with respect to Example 2 to realize weight reduction, and in Example 2, as the same aramid yarn as Comparative Example 3 was used. In addition, Example 1 exhibited higher polyamide 66 density (ends per inch) due to lower aramid yarn fineness than Example 2.

Specifically, single yarns were produced using ply twisting by z-twisting polyamide plies at 100 to 500 TPM for Comparative Examples 1 and 3 and z-twisting aramid plies at 200 to 400 TPM for Comparative Examples 2 and 3 and Examples 1 and 2. In addition, in Comparative Examples 1 and 2, the produced single yarns were put together, in Comparative Example 3, the hybrid cord was produced using cable twisting by s-twisting the produced polyamide plies and aramid plies at 200 to 500 TPM, and in Examples 1 and 2, a hybrid cord was produced using cable twisting by s-twisting the produced single yarns and monofilaments at 200 to 500 TPM.

An initial load of 0.05 g/d was applied to the cords according to Comparative Examples 1 to 3 and Examples 1 and 2, tensile testing was conducted, the slope of the tangent, that is, initial modulus at the origin, more specifically, at a strain of 0 to 1%, based on tire work strain was obtained, a middle modulus was obtained under the condition of 3 to 4% strain and a final modulus was measured when the cord broke and results are shown in the following Table 1. As can be seen from the following Table 1, in Examples 1 and 2, because middle modulus is lower than initial modulus due to the modulus transfer point and an initial/final modulus ratio falls within the range of 1:5 to 1:10, tire shape stability during driving can be improved based on easy processability obtainment during tire production and high modulus of completed tires.

In addition, comparing with Comparative Example 3, Examples 1 and 2 have a clear core-covering structure between nylon and aramid yarns due to polyamide 66 monofilaments with higher stiffness and thus show two modulus transfer points.

TABLE 1

|  | Comparative Example 1 | Comparative Example 2 | Comparative Example 3 | Example 1 | Example 2 |
|---|---|---|---|---|---|
| Structure | Polyamide 66 840D/2 28EPI | Aramid 1500D/2 21EPI | Aramid 1500D/2 + Polyamide 66 1260D/120EPI | Aramid 1500D/1 + Polyamide 66 0.5 mm monofilament 30EPI | Aramid 1500D/2 + Polyamide 66 0.5 mm monofilament 20EPI |
| Cable twist (TPM) | S 470 | S 330 | S 285 | S 370 | S 280 |
| Ply twist (TPM) | Z 480 | Z 330 | Aramid Z 290 Polyamide Z 190 | Aramid Z 385 Polyamide monofilament — | Aramid Z 285 Polyamide monofilament — |
| Number of modulus transfer points | — | — | 1 | 2 | 2 |
| Initial/middle/final modulus ratio | 1/1.3/3.6 | 1/1.1/1.3 | 1/3/13.4 | 1/0.8/6.1 | 1/0.8/6.5 |

[Test Example: Evaluation of Cord Adhesive Strength and Vehicle Performance During Indoor Driving Test]

Performance of the cords produced in Comparative Examples 1 to 3 and Examples 1 to 2 was evaluated by indoor driving testing and vehicle performance testing using tires (225/45R17) produced from the cords and results are shown in the following Table 2 and compared.

1) Uniformity: an index value, which is a combination of values such as R1H, conicity and the like measured using a uniformity tester, is based on Comparative Example 1 and uniformity improves as the number increases.

2) Rolling resistance: measured using Hankook Tire group equipment and expressed as an index based on 100, RRc of Comparative Example 1 and rolling resistance improves as the index increases.

3) Durability at high-speed driving: durability is measured using a drum-type driving durability tester by increasing a speed of 20 to 30 km/h every ten minutes.

4) Dynamic profile (circumference growth during driving): circumference growth is measured based on centrifugal force at a driving speed using a general-purpose tester, profile changes at respective positions of the tread on the shoulder are measured and recorded, and performance improves as profile change decreases.

5) Handling stability, ride comfort and noise: parameters evaluated by vehicle driving of a test driver and considered to be excellent when higher than 100 which is the index of Comparative Example 1.

TABLE 2

|  | Comparative Example 1 | Comparative Example 2 | Comparative Example 3 | Example 1 | Example 2 |
| --- | --- | --- | --- | --- | --- |
| Specifications | 225/45R17 | 225/45R17 | 225/45R17 | 225/45R17 | 225/45R17 |
| Application part | Capply | Capply | Capply | Capply | Capply |
| Weight (kg) | 11.4 | 11.6 | 11.8 | 11.8 | 11.9 |
| Uniformity | 100 | 90 | 97 | 111 | 109 |
| Dynamic profile | 100 | 130 | 125 | 120 | 127 |
| Rolling resistance | 100 | 98 | 96 | 108 | 99 |
| Durability at high-speed driving | 1:45 | 1:55 | 2:00 | 1:58 | 2:03 |
| Handling stability | 100 | 110 | 112 | 117 | 119 |
| Ride comfort | 100 | 80 | 96 | 101 | 98 |
| Noise | 100 | 85 | 102 | 103 | 101 |

(※ when a value is higher than the index 100, the corresponding example is better than Comparative Example 1, and when the value is less than the index, the corresponding example is worse than Comparative Example 1)

As can be seen from Table 2, Comparative Example 1 using the polyamide 66 cord exhibits excellent noise and ride comfort, but has deterioration in durability at high-speed driving and handling stability, and Comparative Example 2 using an aramid cord exhibits excellent durability at high-speed driving and handling stability, but poor noise and ride comfort.

On the other hand, Comparative Example 3 using an aramid-polyamide 66 hybrid cord with a general-purpose fineness were overly good in terms of noise, ride comfort, durability during high-speed driving and handling stability dynamic profile. On the other hand, Comparative Example 3 exhibited poor rolling resistance due to weight increase or the like and a conventional case exhibited irregular physical properties of the hybrid cord and thus poor uniformity.

Examples 1 and 2 using the aramid-polyamide 66 hybrid cord with new physical properties and a production method according to one embodiment exhibited similar or higher durability at high-speed driving, handling stability, dynamic profile, ride comfort and the like, to Comparative Example 3 and better uniformity than Comparative Examples 1 to 3.

Accordingly, when the aramid-polyamide 66 hybrid cord according to one embodiment is used, the aramid hybrid cord using new physical properties, as compared to conventional radial tire polyamide 66 capply and conventional aramid hybrid capply, exhibits small overall physical property deviations and thus decreased tire property deviation. In particular, Example 1 exhibited the best rolling resistance.

As apparent from the foregoing, the hybrid cord produced by plying and twisting a high modulus yarn and a polyamide monofilament can clearly control a modulus ratio in each interval, thus advantageously improving production efficiency of cords, processing efficiency of tires and vulcanization efficiency, and reducing deviations of uniformity and driving performance.

In addition, the tire using the hybrid cord satisfies driving performance, comfort and fuel economy, for example, improves noise, ride comfort, durability and handling stability, and enhances fuel efficiency based on reduction of tire deformation during driving.

Although the preferred embodiments have been disclosed for illustrative purposes, those skilled in the art will appreciate that various modifications, additions and substitutions are possible, without departing from the scope and spirit of the disclosure as recited in the accompanying claims.

What is claimed is:

1. A hybrid cord having a core-covering structure comprising:
    a core comprising a polyamide monofilament; and
    a covering spirally twisted around the core and comprising a high modulus yarn,
    wherein the hybrid cord has a cable twist number of 200 to 500 TPM.

2. The hybrid cord according to claim 1, wherein the high modulus yarn comprises any one selected from the group consisting of aramid, aromatic polyamide, totally aromatic polyester and a mixture thereof.

3. The hybrid cord according to claim 1, wherein the high modulus yarn has a filament size of 500 to 2,250 denier.

4. The hybrid cord according to claim 1, wherein the high modulus yarn has a tensile strength of 16 g/d or more and a Young's modulus of 200 g/d or more.

5. The hybrid cord according to claim 1, wherein the polyamide monofilament has a diameter of 0.2 to 0.8 mm.

6. The hybrid cord according to claim 1, wherein the polyamide monofilament has a stiffness of 0.5 to 4 g·cm.

7. The hybrid cord according to claim 1, wherein the hybrid cord has a twist number, obtained by the equation $$\alpha_d = \frac{T}{100}\sqrt{\rho_d}$$

in the range of 100 to 250, wherein
$\alpha_d$ is a twist number based on denier,
T is twist per meter (TPM), and
$\rho_d$ is a filament size based on denier, of the hybrid cord.

8. A tire comprising the hybrid cord according to claim 1.

* * * * *